United States Patent
Wei

(10) Patent No.: US 9,699,675 B2
(45) Date of Patent: Jul. 4, 2017

(54) METHOD OF HANDLING INTERFERENCE MEASUREMENT IN TDD SYSTEM AND RELATED COMMUNICATION DEVICE

(71) Applicant: ACER INCORPORATED, New Taipei (TW)

(72) Inventor: Hung-Yu Wei, New Taipei (TW)

(73) Assignee: ACER INCORPORATED, New Taipei (TW)

(*) Notice: Subject to any disclaimer, the term of this patent is extended or adjusted under 35 U.S.C. 154(b) by 96 days.

(21) Appl. No.: 14/164,277

(22) Filed: Jan. 27, 2014

(65) Prior Publication Data

US 2014/0219121 A1 Aug. 7, 2014

Related U.S. Application Data

(60) Provisional application No. 61/760,181, filed on Feb. 4, 2013.

(51) Int. Cl.
| | |
|---|---|
| *H04W 24/08* | (2009.01) |
| *H04W 24/10* | (2009.01) |
| *H04L 5/22* | (2006.01) |
| *H04W 24/02* | (2009.01) |

(52) U.S. Cl.
CPC ............ *H04W 24/08* (2013.01); *H04L 5/22* (2013.01); *H04W 24/10* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 6,167,031 | A * | 12/2000 | Olofsson et al. | 370/252 |
| 2010/0080153 | A1* | 4/2010 | Kahn et al. | 370/310 |
| 2010/0322118 | A1* | 12/2010 | Fang et al. | 370/280 |
| 2012/0069749 | A1* | 3/2012 | Famolari et al. | 370/252 |
| 2012/0188877 | A1* | 7/2012 | Chin et al. | 370/241 |
| 2012/0236736 | A1* | 9/2012 | Frank et al. | 370/252 |
| 2012/0275322 | A1* | 11/2012 | Ji et al. | 370/252 |
| 2012/0275357 | A1* | 11/2012 | Tirkkonen et al. | 370/310 |

(Continued)

FOREIGN PATENT DOCUMENTS

| | | |
|---|---|---|
| EP | 2 221 985 A2 | 8/2010 |
| EP | 2 221 985 A3 | 3/2011 |

(Continued)

OTHER PUBLICATIONS

Itri, Evaluation of eIMTA with dual CSI feedbacks, 3GPP TSG RAN WG1 Meeting #72, R1-130148, Jan. 28-Feb. 1, 2013, XP050663332, St Julian's, Malta.

(Continued)

*Primary Examiner* — Tejis Daya
(74) *Attorney, Agent, or Firm* — Winston Hsu

(57) ABSTRACT

A method of handling an interference measurement for a communication device in a time-division duplexing (TDD) system comprises receiving a signal; measuring an interference coming from at least one cell with at least one uplink/downlink (UL/DL) configuration in the TDD system in a subframe according to the signal, to obtain a measured interference; and generating a measurement result comprising the measured interference and information of the at least one UL/DL configuration of the at least one cell.

11 Claims, 9 Drawing Sheets

(56) References Cited

U.S. PATENT DOCUMENTS

| | | | |
|---|---|---|---|
| 2013/0059583 A1* | 3/2013 | Van Phan et al. | 455/435.1 |
| 2013/0083706 A1* | 4/2013 | Lin | 370/280 |
| 2013/0188532 A1* | 7/2013 | Zhang et al. | 370/280 |
| 2014/0160967 A1* | 6/2014 | Gao | H04W 24/10 370/252 |
| 2014/0369221 A1* | 12/2014 | Fu et al. | 370/252 |

FOREIGN PATENT DOCUMENTS

| | | | | |
|---|---|---|---|---|
| WO | WO 2010099485 A1 * | 9/2010 | | H04W 16/10 |
| WO | 2012115811 A1 | 8/2012 | | |

OTHER PUBLICATIONS

CATT, Interference mitigation schemes for TDD eIMTA, 3GPP TSG RAN WG1 Meeting #72, R1-130049, Jan. 28-Feb. 1, 2013, XP050663295, St. Julian's, Malta.

3rd Generation Partnership Project; Technical Specification Group Radio Access Network; Evolved Universal Terrestrial Radio Access (E-UTRA); Physical layer procedures (Release 11), 3GPP TS 36.213 V11.1.0, Technical Specification, XP050691223, 2012-12.

* cited by examiner

| UL/DL configuration | Subframe number 0 1 2 3 4 5 6 7 8 9 |
|---|---|
| 0 | D S U U U D S U U U |
| 1 | D S U U D D S U U D |
| 2 | D S U D D D S U D D |
| 3 | D S U U U D D D D D |
| 4 | D S U U D D D D D D |
| 5 | D S U D D D D D D D |
| 6 | D S U U U D S U U D |

FIG. 1 PRIOR ART

| Scheme index | Intra-cell subframe type | Inter-cell subframe type | Role |
|---|---|---|---|
| 1 | Downlink | Downlink | Transmitter |
| 2 | Downlink | Downlink | Receiver |
| 3 | Downlink | Downlink | Measure-only device |
| 4 | Uplink | Uplink | Transmitter |
| 5 | Uplink | Uplink | Receiver |
| 6 | Uplink | Uplink | Measure-only device |
| 7 | Downlink | Uplink | Transmitter |
| 8 | Downlink | Uplink | Receiver |
| 9 | Downlink | Uplink | Measure-only device |
| 10 | Uplink | Downlink | Transmitter |
| 11 | Uplink | Downlink | Receiver |
| 12 | Uplink | Downlink | Measure-only device |

FIG. 8

| Scheme index | Intra-cell subframe type | Inter-cell subframe type |
|---|---|---|
| 1 | Downlink | Downlink |
| 2 | Downlink | Uplink |
| 3 | Uplink | Downlink |
| 4 | Uplink | Uplink |
| 5 | Uplink | Blank |
| 6 | Blank | Uplink |
| 7 | Downlink | Blank |
| 8 | Blank | Downlink |
| 9 | Downlink | Uplink |
| 10 | Downlink | Special |
| 11 | Special | Downlink |

FIG. 9

METHOD OF HANDLING INTERFERENCE MEASUREMENT IN TDD SYSTEM AND RELATED COMMUNICATION DEVICE

CROSS REFERENCE TO RELATED APPLICATIONS

This application claims the benefit of U.S. Provisional Application No. 61/760,181, filed on Feb. 4, 2013 and entitled "Interference Measurement Mechanism for Dynamic TDD System", the contents of which are incorporated herein in their entirety.

BACKGROUND OF THE INVENTION

1. Field of the Invention

The present invention relates to a method used in a wireless communication system and related communication device, and more particularly, to a method of handling an interference measurement in a time-division duplexing (TDD) system and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode, directions of subframes of a frequency band in the LTE/LTE-A system operating in a time-division duplexing (TDD) mode may be different. That is, the subframes in the same frequency band are divided into uplink (UL) subframes, downlink (DL) subframes and special subframes according to the UL/DL configuration specified in the 3GPP standard.

Please refer to FIG. 1 which is a table 10 of the UL/DL configuration with subframes and corresponding directions. In FIG. 1, 7 UL/DL configurations are shown, wherein each of the UL/DL configurations indicates a set of directions for 10 subframes, respectively. In detail, "U" means that the subframe is a UL subframe where UL data is transmitted, and "D" means that the subframe is a DL subframe where DL data is transmitted. "S" means that the subframe is a special subframe where control information and maybe data (according to the special subframe configuration) is transmitted.

However, eNBs in the LTE/LTE-A system operating in the TDD mode (hereinafter, the TDD system, for short) may be configured with various UL/DL configurations. In other words, a DL subframe for an eNB may be UL subframes for neighboring eNBs of the eNB, when the eNB and the neighboring eNBs are configured with different UL/DL configurations. Alternatively, a UL subframe for the eNB may be DL subframes for the neighboring eNBs of the eNB. In this situation, diverse measurement results may be obtained by the eNB or a UE in a coverage area of the eNB, when measurements of interferences are performed in different subframes. The diverse measurement results mainly come from that different combinations of subframe types of the eNB and the neighboring eNBs may occur in a single subframe. For example, a combination may be that a subframe is DL (or UL) for all of the eNB and the neighboring eNBs. In another example, a combination may be that a subframe is DL (or UL) for the eNB and some of the neighboring eNBs, while the subframe is UL (or DL) for the other neighboring eNBs. Thus, it is difficult for the eNB and the UE to utilize the diverse measurement results efficiently. Interference measurement in the TDD system becomes an important problem to be solved.

SUMMARY OF THE INVENTION

The present invention therefore provides a method and related communication device for handling an interference measurement in the TDD system to solve the abovementioned problem.

A method of handling an interference measurement for a communication device in a time-division duplexing (TDD) system comprises receiving a signal; measuring an interference coming from at least one cell with at least one uplink/downlink (UL/DL) configuration in the TDD system in a subframe according to the signal, to obtain a measured interference; and generating a measurement result comprising the measured interference and information of the at least one UL/DL configuration of the at least one cell.

A communication device in a time-division duplexing (TDD) system for handling an interference measurement comprises a processing means for executing a program; and a storage unit coupled to the processing means for storing the program; wherein the program instructs the processing means to perform the following steps: receiving a signal; measuring an interference coming from at least one cell with at least one uplink/downlink (UL/DL) configuration in the TDD system in a subframe according to the signal, to obtain a measured interference; and generating a measurement result comprising the measured interference and information of the at least one UL/DL configuration of the at least one cell.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table 10 of the UL/DL configuration with subframes and corresponding directions.

FIG. 8 is a table 80 of scheme indices with corresponding subframe types and roles of a communication device according to an example of the present invention.

FIG. 9 is a table 90 of scheme indices with corresponding subframe types according to an example of the present invention.

DETAILED DESCRIPTION

Figure 2:
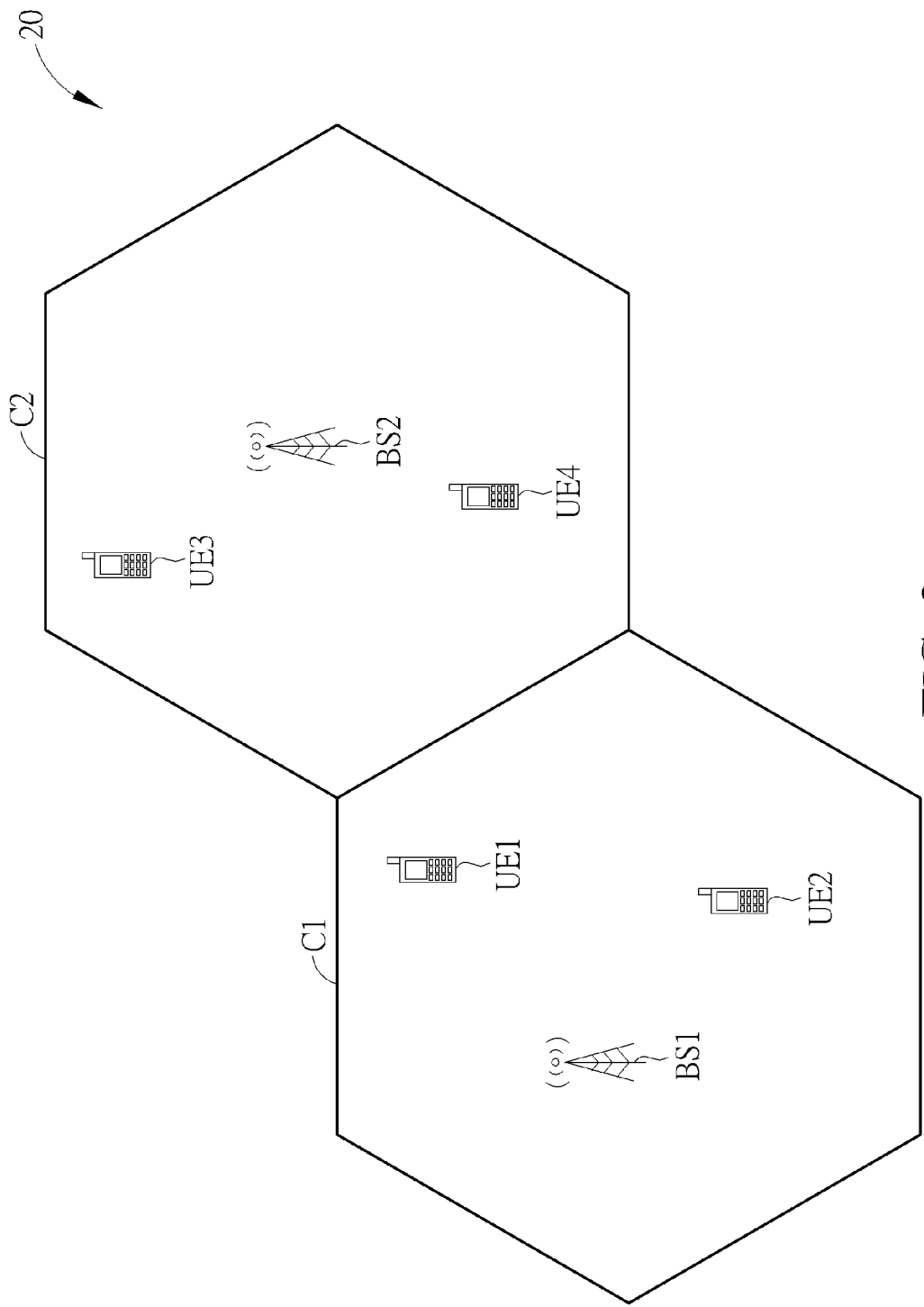
FIG. 2 is a schematic diagram of a wireless communication system according to an example of the present invention.

Please refer to FIG. 2, which is a schematic diagram of a wireless communication system 20 according to an example of the present invention. The wireless communication system 20 is briefly composed of two base stations (BSs) BS1-BS2 and four user equipments (UEs) UE1-UE4. The wireless communication system 20 supports a time-division duplexing (TDD) mode, hereinafter the TDD system 20 for short. That is, the BSs BS1-BS2 and the UEs UE1-UE4 can communicate with each other by using uplink (UL) subframes and downlink (DL) subframes according to one or more UL/DL configurations.

Please note that, in one example, coverage areas of the BSs BS1-BS2 can be seen as two different cells C1-C2, e.g., partly overlapped cells or nonoverlapped cells. As shown in FIG. 2, the UEs UE1-UE2 are in the cell C1 and the UEs UE3-UE4 are in the cell C2. That is, the cell C1 can be seen as a serving cell of the UEs UE1-UE2, and the cell C2 can be seen as a serving cell of the UEs UE3-UE4. In addition, a single BS may generate multiple cells. For example, the UEs UE1 and UE2 may be in different cells controlled by the BS BS1.

In FIG. 2, the BSs BS1-BS2 and the UEs UE1-UE4 are simply utilized for illustrating the structure of the TDD system 20. For example, the BSs BS1-BS2 and the UEs UE1-UE4 may support the 3rd Generation Partnership Project (3GPP) Rel-11 standard or later versions. In detail, a BS maybe a Node-B (NB) in universal terrestrial radio access network (UTRAN) of a universal mobile telecommunications system (UMTS). In another example, the BS may be an evolved NB (eNB) or a relay in an evolved UTRAN (E-UTRAN) of a long term evolution (LTE) system, a LTE-Advanced (LTE-A) system or an evolution of the LTE-A system. A UE can be a mobile phone, a laptop, a tablet computer, an electronic book or a portable computer system but is not limited. In addition, a BS and a UE can be seen as a transmitter or a receiver according to a direction of transmission/reception, e.g., for an UL, the UE is the transmitter and the BS is the receiver, and for a DL, the BS is the transmitter and the UE is the receiver. More specifically, for the BS, the direction of the transmission is DL, and the direction of the reception is UL. For the UE, the direction of the transmission is UL, and the direction of the reception is DL.

Figure 3:
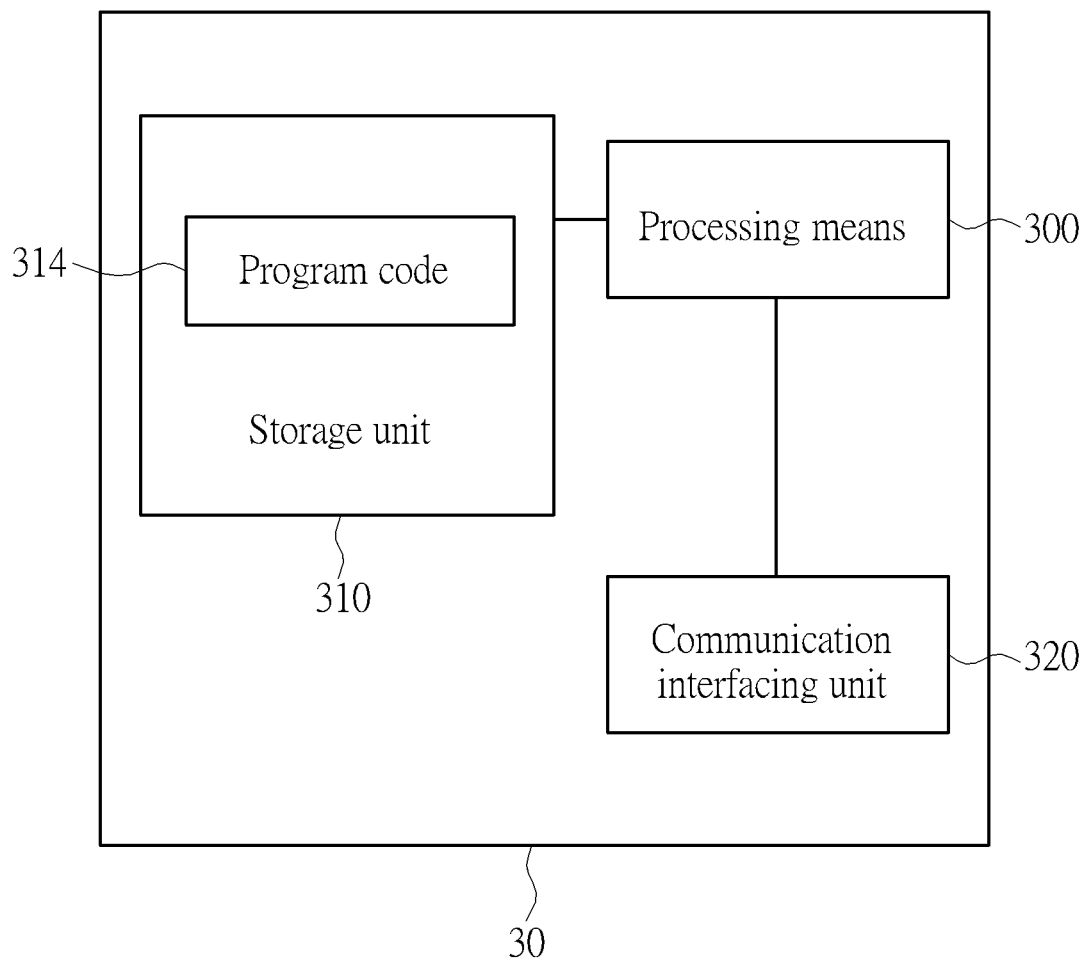
FIG. 3 is a schematic diagram of a communication device according to an example of the present invention.

Please refer to FIG. 3, which is a schematic diagram of a communication device 30 according to an example of the present invention. The communication device 30 can be a UE (e.g., the UE UE1, UE2, UE3 or UE4) or a BS (e.g., the BS BS1 or BS2) shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
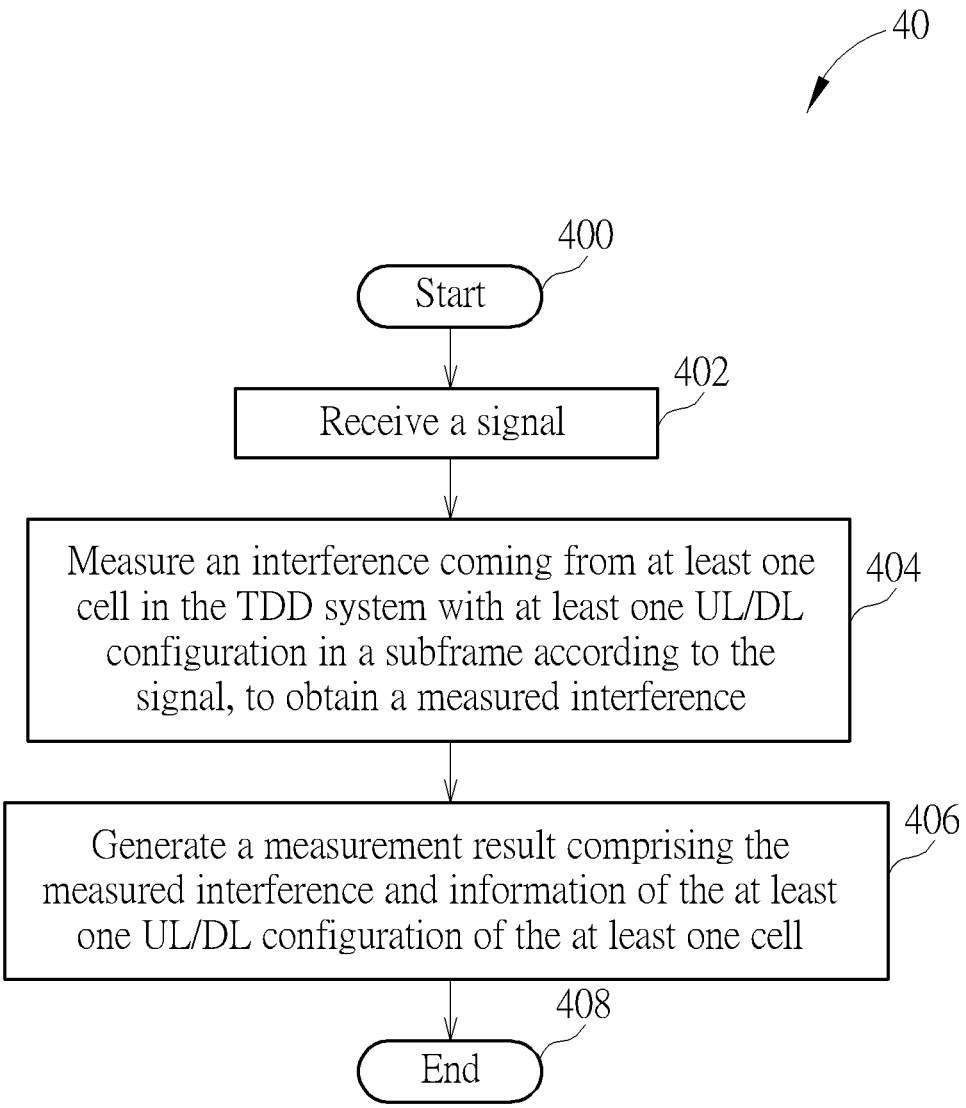
FIG. 4 is a flowchart of a process according to an example of the present invention.

Please refer to FIG. 4, which is a flowchart of a process 40 according to an example of the present invention. The process 40 is utilized in a communication device, for handling an interference measurement in a TDD system. The process 40 may be compiled into the program code 314 and includes the following steps:

Step 400: Start.

Step 402: Receive a signal.

Step 404: Measure an interference coming from at least one cell in the TDD system with at least one UL/DL configuration in a subframe according to the signal, to obtain a measured interference.

Step 406: Generate a measurement result comprising the measured interference and information of the at least one UL/DL configuration of the at least one cell.

Step 408: End.

According to the process 40, the communication device measures an interference coming from (i.e., caused by) at least one cell in the TDD system with at least one UL/DL configuration in a subframe according to (e.g., by using) the signal, to obtain a measured interference, after receiving a signal. Then, the communication device generates a measurement result comprising the measured interference and information of the at least one UL/DL configuration of the at least one cell. In other words, the measurement result not only includes the measured interference but also includes the information of the at least one UL/DL configuration. The information can be used for determining a situation (i.e., scenario) in which the interference is measured. Thus, the measured interference can be exploited efficiently by the communication device and/or another communication device receiving the measurement result from the communication device, because the information of the at least one UL/DL configuration is also available in the measurement result. As a result, throughput of the communication device and/or another communication device is improved.

Realization of the present invention is not limited to the example of the process 40.

Figure 5:
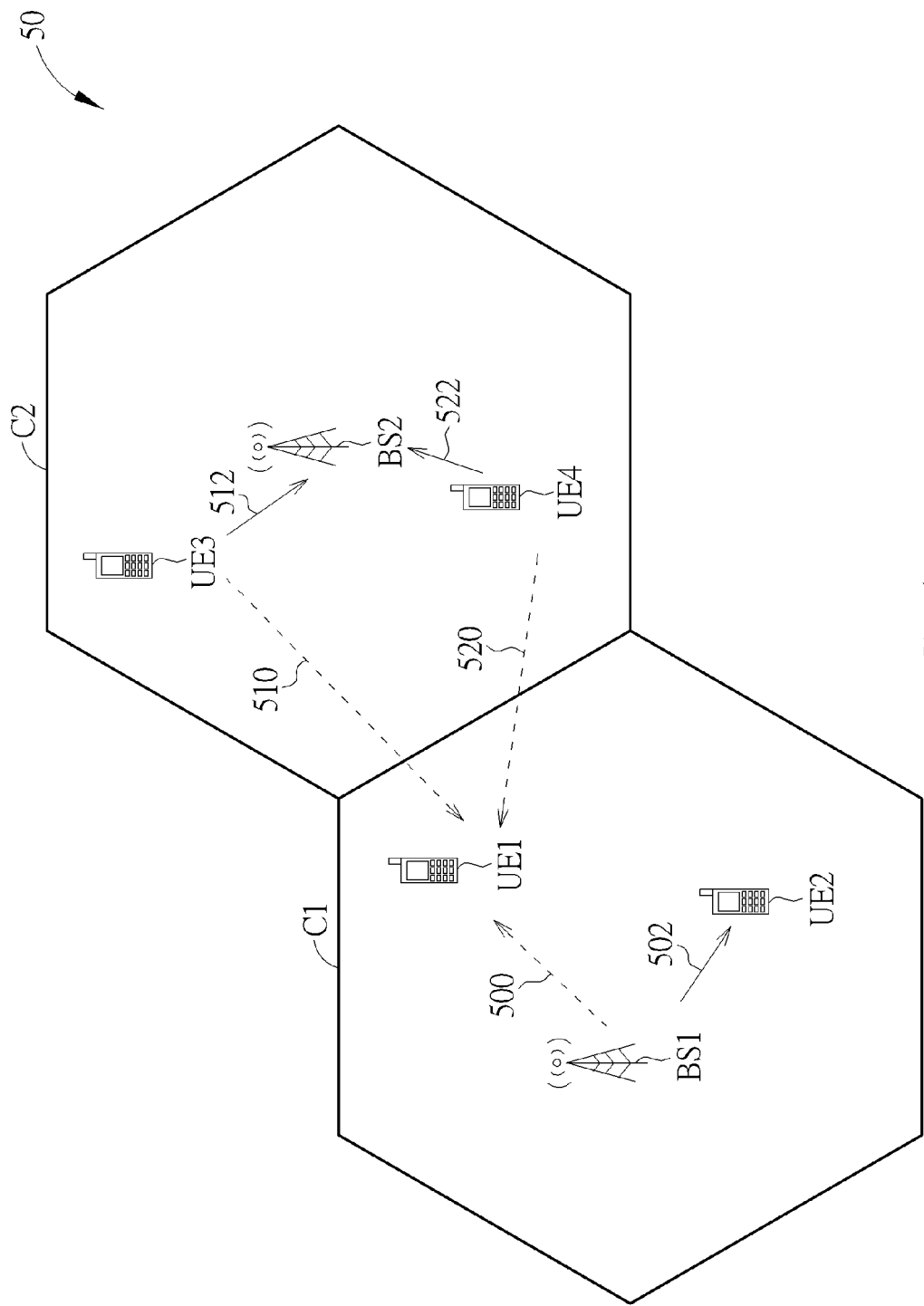
FIG. 5 is a schematic diagram of a schematic diagram of a TDD system 50 according to an example of the present invention.

Please refer to FIG. 5, which is a schematic diagram of a TDD system 50 according to an example of the present invention. Let the UE UE1 be the communication device mentioned in the process 40 and let the cells C1-C2 be the at least one cell mentioned in the process 40. The UEs UE1-UE4 and the BSs BS1 and BS2 operate according to various UL/DL configurations in a subframe. The interference mentioned in the process 40 may be a summation of interferences caused by the BS BS1 and the UEs UE3-UE4 in the present example. In detail, the interference may include an interference 500 caused by a transmission 502 from the BS BS1 to the UE UE2, an interference 510 caused by a transmission 512 from the UE UE3 to the BS BS2, and an interference 520 caused by a transmission 522 from the UE UE4 to the BS BS2. As an example, the subframe can be the subframe 3, and the UL/DL configurations of the BS BS1 and the UEs UE3-UE4 can be the UL/DL configurations 2, 3 and 4, respectively, as shown in FIG. 1. According to the process 40, the UE UE1 obtains a measured interference, after measuring the summation of the interferences 500, 510 and 520 by using a received signal. Then, the UE UE1 generates a measurement result including the measured interference and information of the UL/DL configurations of the BS BS1 and the UEs UE3-UE4.

As can be seen, the subframe is a DL subframe for the cell C1 (i.e., the BS BS1), and a UL subframe for the cell C2 (i.e., the UEs UE3 and UE4). The interference includes both the DL interference (i.e., the interference 500) and the UL interference (i.e., the interferences 510 and 520). In addition, the interference 500 can be seen as an intra-cell interference with respect to the UE UE1, since the interference 500 comes from the cell C1 where the UE UE1 locates. Oppositely, the interferences 510 and 520 can be seen as an inter-cell interference with respect to the UE UE1, since the interferences 510 and 520 come from the cell C2.

Figure 6:
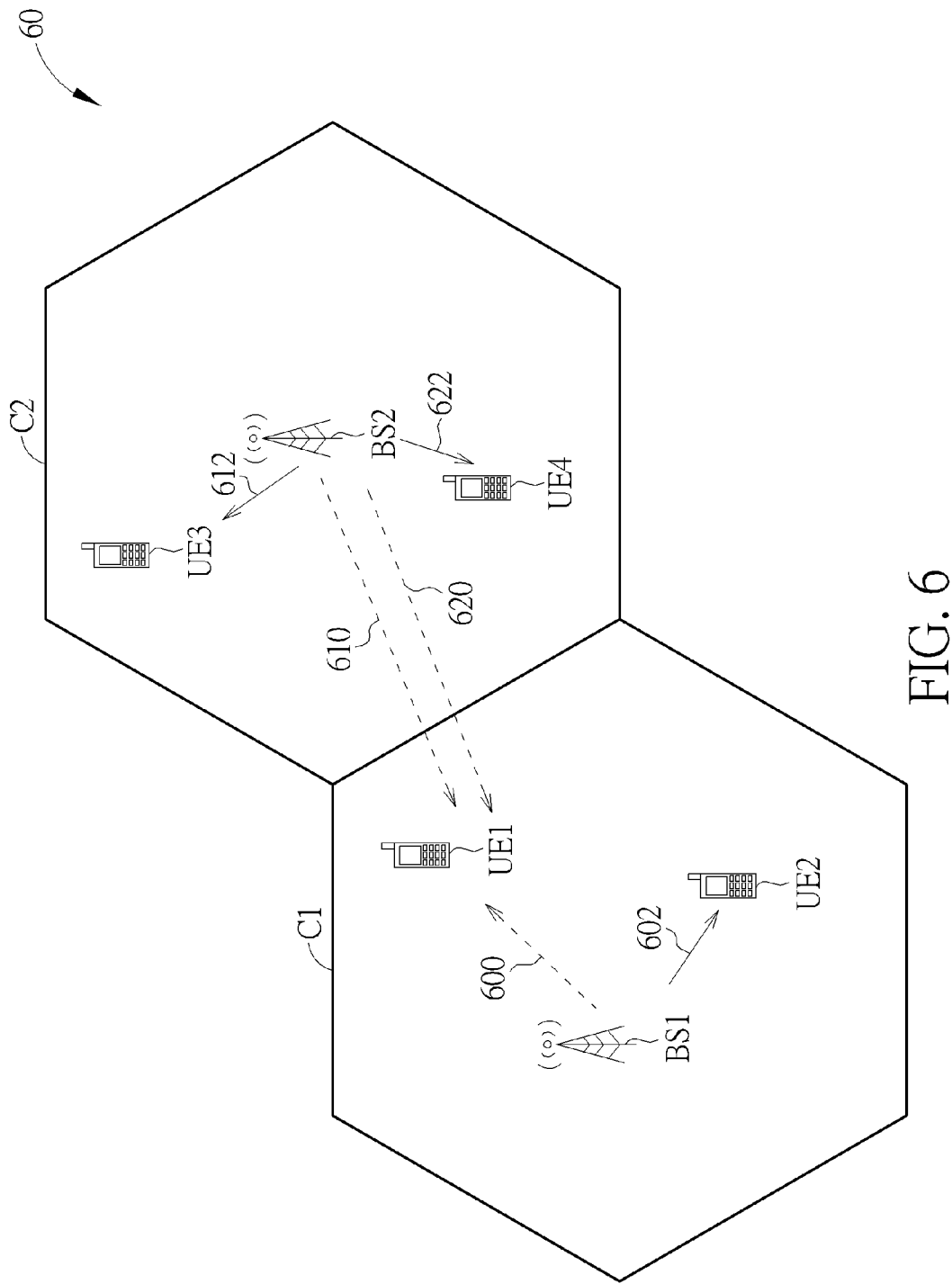
FIG. 6 is a schematic diagram of a schematic diagram of a TDD system 60 according to an example of the present invention.

Please refer to FIG. 6, which is a schematic diagram of a TDD system 60 according to an example of the present invention. Similarly, let the UE UE1 be the communication device mentioned in the process 40 and let the cells C1-C2 be the at least one cell mentioned in the process 40. The UEs UE1-UE4 and the BSs BS1 and BS2 operate according to various UL/DL configurations in a subframe. The interference mentioned in the process 40 may be a summation of interferences caused by the BSs BS1-BS2 in the present example. In detail, the interference may include an interference 600 caused by a transmission 602 from the BS BS1 to the UE UE2, an interference 610 caused by a transmission 612 from the BS BS2 to the UE UE3, and an interference 620 caused by a transmission 622 from the BS BS2 to the UE UE4. As an example, the subframe can be the subframe 5, and the UL/DL configurations of the BSs BS1-BS2 can be the UL/DL configurations 1 and 2, respectively, as shown in FIG. 1. According to the process 40, the UE UE1 obtains a measured interference, after measuring the summation of the interferences 600, 610 and 620 by using a received signal. Then, the UE UE1 generates a measurement result including the measured interference and information of the UL/DL configurations of the BSs BS1-BS2.

As can be seen, the subframe is a DL subframe for the cells C1-C2 (i.e., the BSs BS1-BS2). The interference includes only the DL interferences (i.e., the interference 600, 610 and 620). In addition, the interference 600 can be seen as an intra-cell interference with respect to the UE UE1, since the interference 600 comes from the cell C1 where the UE UE1 locates. Oppositely, the interferences 610 and 620 can be seen as an inter-cell interference with respect to the UE UE1, since the interferences 610 and 620 come from the cell C2.

Figure 7:
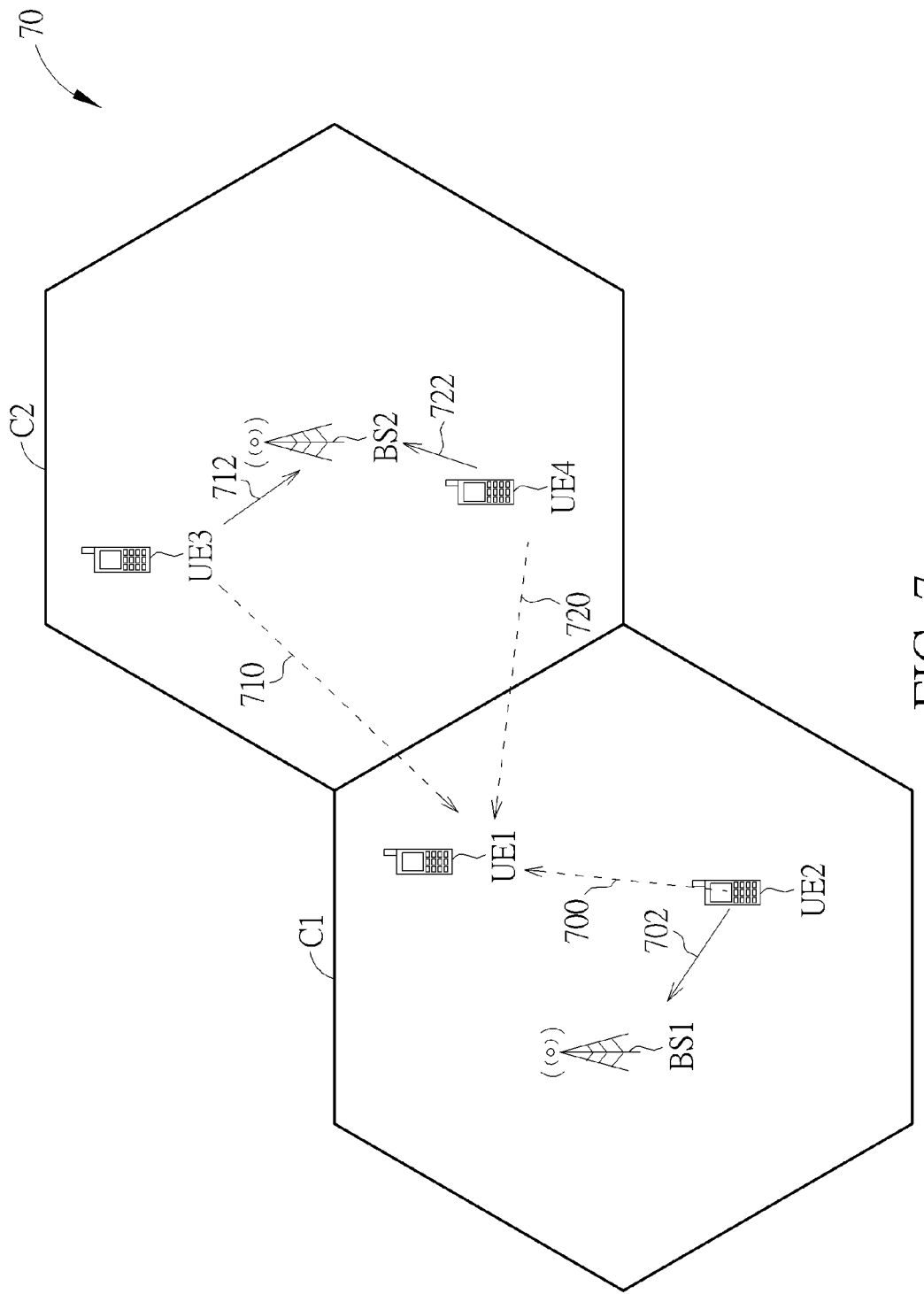
FIG. 7 is a schematic diagram of a schematic diagram of a TDD system 70 according to an example of the present invention.

Please refer to FIG. 7, which is a schematic diagram of a TDD system 70 according to an example of the present invention. Similarly, let the UE UE1 be the communication device mentioned in the process 40 and let the cells C1-C2 be the at least one cell mentioned in the process 40. The UEs UE1-UE4 and the BSs BS1 and BS2 operate according to various UL/DL configurations in a subframe. The interference mentioned in the process 40 maybe a summation of interferences caused by the UEs UE2-UE4 in the present example. In detail, the interference may include an interference 700 caused by a transmission 702 from the UE UE2 to the BS BS1, an interference 710 caused by a transmission 712 from the UE UE3 to the BS BS2, and an interference 720 caused by a transmission 722 from the UE UE4 to the BS BS2. As an example, the subframe can be the subframe 6, and the UL/DL configurations of the UEs UE2-UE4 can be the UL/DL configurations 0, 1 and 2, respectively, as shown in FIG. 1. According to the process 40, the UE UE1 obtains a measured interference, after measuring the summation of the interferences 700, 710 and 720 by using a received signal. Then, the UE UE1 generates a measurement result including the measured interference and information of the UL/DL configurations of the UEs UE2-UE4.

As can be seen, the subframe is a UL subframe for the cells C1-C2 (i.e., the UEs UE2-UE4). The interference includes only the UL interferences (i.e., the interference 700, 710 and 720). In addition, the interference 700 can be seen as an intra-cell interference with respect to the UE UE1, since the interference 700 comes from the cell C1 where the UE UE1 locates. Oppositely, the interferences 710 and 720 can be seen as an inter-cell interference with respect to the UE UE1, since the interferences 710 and 720 come from the cell C2.

Please note that, a method according to which a communication device (e.g., the communication device in the process 40 or the UE UE1 in the above descriptions) measures an interference is not limited. For example, the communication device may measure the interference according to a measurement configuration including a resource via which the interference is measured and/or an indicator indicating the communication device to measure the interference. The resource may be a time and/or a frequency band at which the interference is to be measured. The indicator may be an identity of the communication device, to notify the communication device to measure the interference. In addition, the measurement configuration may include multiple resources and multiple indicators indicating multiple communication devices to measure the interference.

In addition, the communication device maybe in one of at least one cell, when the interference comes from the at least one cell. That is, part of the interference comes from a serving cell of the communication device. In another example, the communication device may not be in one of the at least one cell. That is, the interference completely comes from neighboring cells.

In addition, the information of the at least one cell mentioned in the process 40 may include an indicator (e.g., scheme index) indicates a situation in which the measured interference is obtained according to the at least one UL/DL configuration. For example, the situation may include at least one subframe type of the subframe of at least one UL/DL configuration of the at least one cell. In another example, the information may further include attributes such as a role (e.g., UE, BS, etc.) of the communication device measuring the interference. The role may be a transmitter, a receiver, a measure-only device.

Please refer to FIG. 8, which is a table 80 of scheme indices with corresponding subframe types and roles of a communication device according to an example of the present invention. As shown in FIG. 8, each scheme index indicates a specific combination of intra-cell subframe type, inter-cell subframe type and the role of the communication device.

Please refer to FIG. 9, which is a table 90 of scheme indices with corresponding subframe types of a communication device according to an example of the present invention. Different from FIG. 8, each scheme index indicates a specific combination of intra-cell subframe type and inter-cell subframe type of the communication device in FIG. 9. In addition, more subframe types are introduced in FIG. 9, such as a special subframe shown in FIG. 1 and a blank subframe wherein no transmission/reception is performed. Thus, the communication device obtaining the scheme index can determining the situation in which the interference is measured.

Note that the UE measures the interference in the above examples. This is not a limitation, and a BS may measure the interference in another example. That is, the communication device (e.g., the communication device in the process 40) mentioned above may be a UE or a BS. In addition, the measured interference may include any quality metric such as a carrier to interference ratio, a carrier to interference plus noise ratio, an interference over thermal noise ratio, a bit error rate/frame error rate (e.g., in a data session), and is not limited.

On the other hand, the signal used for measuring the interference is not limited. For example, the signal may be a reference signal which is used for estimating one or more system parameters and/or performing one or more measurements. In another example, the signal maybe a data packet. That is, the communication device measures the interference during regular communications, and the reference signal may not be needed. The above situations may happen when the communication device is in an active mode (e.g., connected mode). In another example, the communication device may measure the interference by using a background traffic, when the communication device is in an inactive mode (e.g., idle mode).

Please note that, an operation performed by the communication device on a measurement result after obtaining the measurement result is not limited. For example, the communication device may communicate with another communication device in the TDD system according to the measurement result. That is, the communication device uses the measurement result itself. For example, the communication device may adjust its transmission power according to the measurement result. In another example, the communication device may transmit the measurement result to another communication device in the TDD system. That is, the communication device shares the measurement result with another communication device, such that another communication device can use the measurement result. Note that the communication device can be a UE or a BS. Similarly, another communication device can be a UE or a BS. That is, the sharing of the measurement result can occur between the UE/the BS and the UE/the BS.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for handling an interference measurement in the TDD system. A communication device can use a measured interference efficiently according to information of one or more UL/DL configurations related to the measured interference. As a result, throughput of the communication device is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an interference measurement for a communication device in a time-division duplexing (TDD) system, the method comprising:
   receiving a signal;
   measuring an interference coming from at least one cell with at least one uplink/downlink (UL/DL) configuration in the TDD system in a subframe according to the signal, to obtain a measured interference; and
   generating a measurement result comprising the measured interference and information of the at least one UL/DL configuration of the at least one cell;
   wherein the communication device measures the interference according to a measurement configuration comprising a resource via which the interference is measured and a first indicator indicating the communication device to measure the interference;
   wherein the information comprises a second indicator indicating a situation in which the measured interference is obtained according to the at least one UL/DL configuration.

2. The method of claim 1, wherein the communication device is in one of the at least one cell.

3. The method of claim 1, wherein the situation comprises at least one subframe type of the subframe of the at least one UL/DL configuration.

4. The method of claim 1, wherein the signal is a reference signal.

5. The method of claim 1, wherein the signal is a data packet.

6. The method of claim 1, wherein the communication device is in an active mode.

7. The method of claim 1, wherein the communication device is in an inactive mode.

8. The method of claim 1, further comprising:
   communicating with another communication device in the TDD system according to the measurement result.

9. The method of claim 1, further comprising:
   transmitting the measurement result to another communication device in the TDD system.

10. The method of claim 1, wherein the measured interference comprises a carrier to interference ratio, a carrier to interference plus noise ratio, an interference over thermal noise ratio, a bit error rate and/or a frame error rate.

11. A communication device in a time-division duplexing (TDD) system for handling an interference measurement, comprising:
    a storage unit for storing instructions of:
       receiving a signal;
       measuring an interference coming from at least one cell with at least one uplink/downlink (UL/DL) configuration in the TDD system in a subframe according to the signal, to obtain a measured interference; and generating a measurement result comprising the measured interference and information of the at least one UL/DL configuration of the at least one cell;

wherein the communication device measures the interference according to a measurement configuration comprising a resource via which the interference is measured and a first indicator indicating the communication device to measure the interference;

wherein the information comprises a second indicator indicating a situation in which the measured interference is obtained according to the at least one UL/DL configuration; and a processing means, coupled to the storage unit, configured to execute the instructions stored in the storage unit.

* * * * *